COUNTER

Filed Jan. 31, 1956 5 Sheets-Sheet 1

INVENTORS
HOWARD L. DANIELS
VALERIUS E. HERZFELD
BY
Cushman, Darby & Cushman
ATTORNEYS

INVENTORS
HOWARD L. DANIELS
VALERIUS E. HERZFELD

BY Cushman, Darby & Cushman
ATTORNEYS

COUNTER

Filed Jan. 31, 1956 5 Sheets-Sheet 3

INVENTORS
HOWARD L. DANIELS
VALERIUS E. HERZFELD
BY Cushman, Darby & Cushman
ATTORNEYS Feb. 28, 1961 H. L. DANIELS ET AL 2,973,145

COUNTER

Filed Jan. 31, 1956 5 Sheets-Sheet 4

INVENTORS
HOWARD L. DANIELS
VALERIUS E. HERZFELD

BY
Cushman, Darby & Cushman
ATTORNEYS

Feb. 28, 1961 H. L. DANIELS ET AL 2,973,145

COUNTER

Filed Jan. 31, 1956 5 Sheets-Sheet 5

INVENTORS
HOWARD L. DANIELS
VALERIUS E. HERZFELD

BY Cushman, Darby & Cushman
ATTORNEYS

United States Patent Office 2,973,145
Patented Feb. 28, 1961

2,973,145

COUNTER

Howard L. Daniels and Valerius E. Herzfeld, St. Paul, Minn., assignors to Sperry Rand Corporation, New York, N.Y., a corporation of Delaware Filed Jan. 31, 1956, Ser. No. 562,393

6 Claims. (Cl. 235—132)

This invention relates to electro-mechanical counter units and to counters made up of such units.

In greater detail, the present invention relates to counter units and counters wherein each unit is connectable for receiving input signals, for delivering read-out signals, and for delivering carry signals entirely by electrical circuits. No mechanical interconnections between units are required. In counters made up of counter units both according to the present invention, the carry from units of lesser digit significance to greater digit significance is entirely electrical, and the arrangement insures that the electrical carry pulse is of sufficient duration and strength as to positively operate the higher unit.

Counter units according to the present invention further provide read-out arrangements making possible read-out in any convenient code. Improved resetting of all of the counter units simultaneously to 0 is provided. Moreover, circuits are provided for presetting counters to selected input numbers, so that there may be a count down or up to 0 whereat a usable indication signal is generated.

Accordingly, it is a primary object of this invention to provide improved electro-mechanical counter units and counters.

It is a further object of the invention to provide such counter units and counters wherein electrical carry signals are relied upon and are of dependable duration and strength to insure operation of the next higher counter unit.

Another object of the invention is to provide electrical read-out in decimal, binary or any other coded representation.

A further object of the invention is to provide a counter capable of actuating a tape punch or other means to record the count therein.

A still further object of the present invention is to provide in an electro-mechanical counter a circuit for obtaining analog voltage outputs.

A further object of the present invention is to provide an electro-mechanical counter connected with an adjustable capacitor so that the capacity of an output circuit can be varied with the count contained within the counter unit.

Additional objects of the invention are in part expressed and in part obvious from the following detailed description of illustrative embodiments of the invention, and from the appended claims.

Illustrative embodiments of the invention can be best understood with reference to the accompanying drawings, wherein.

Figure 1:
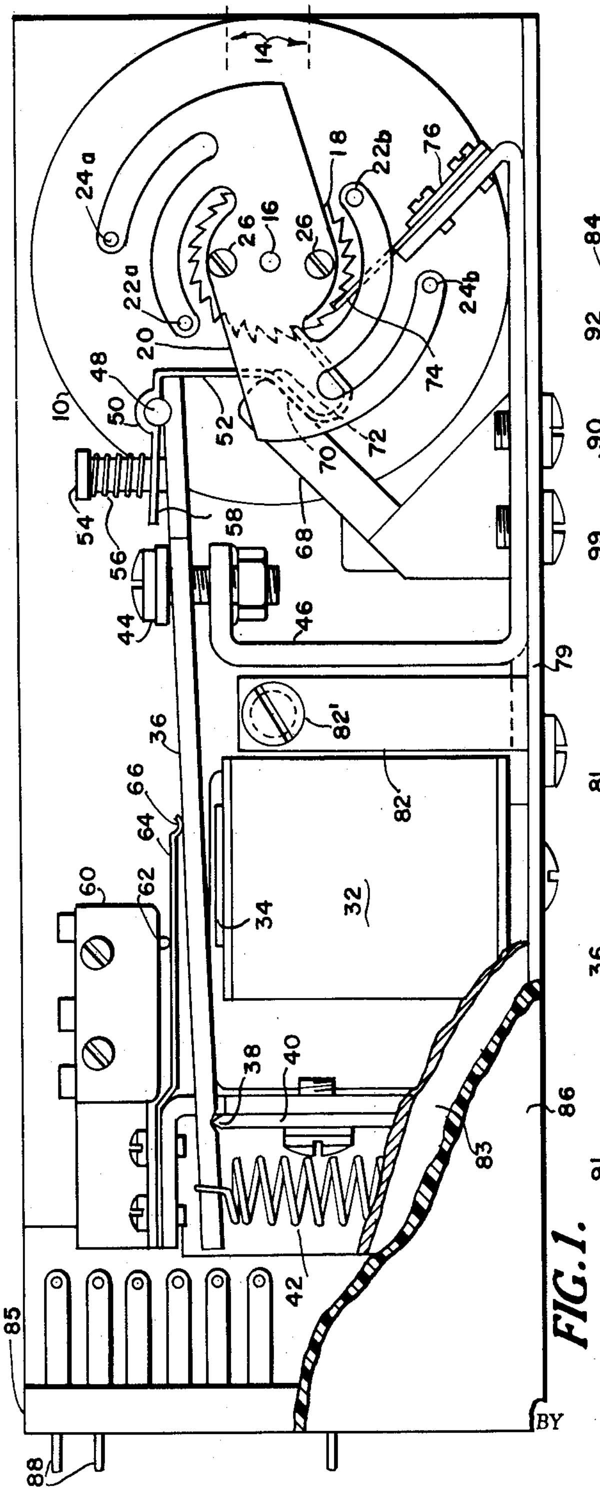
Figure 1 shows a side elevational view with side members partly broken away, of a counter unit according to the invention.
Figure 2:
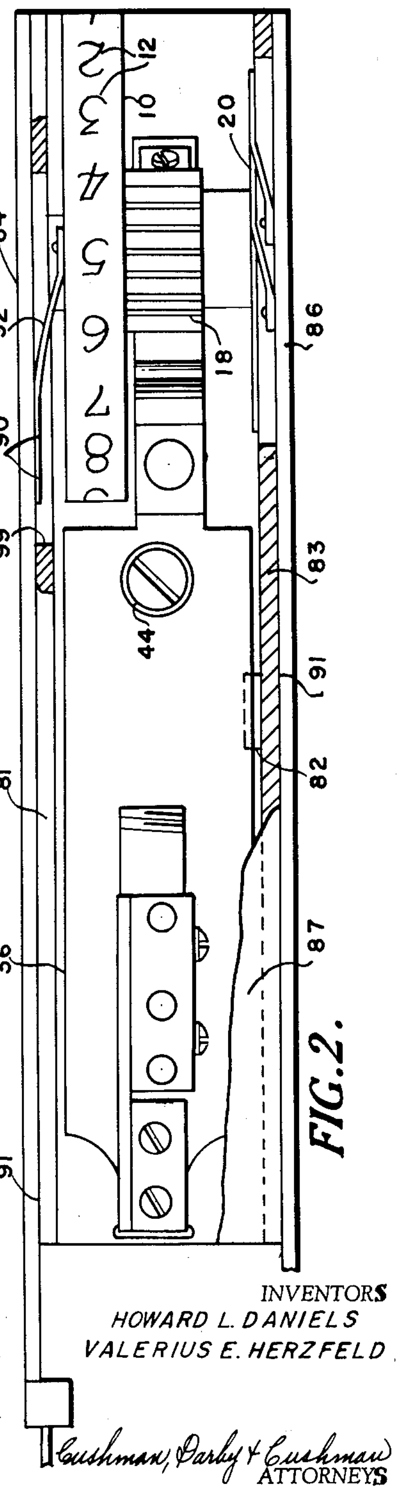
Figure 2 shows a top view of the counter of Figure 1, with certain top covering members partly broken away.

The structural details of an exemplary embodiment of a counter unit according to the invention are shown in Figures 1–4. The counter unit is characterized by an assembly of structure which is movable step-by-step with respect to the remainder of the structure. The movable structure includes a function wheel 10 on the periphery of which may be placed numerals 12 for providing at a window area 14 (Fig. 1) a visual indication of the count accumulated in the unit. In the illustrated embodiment, there are two series of numerals, each 0 through 9. It will be understood that there could be any number of series of numerals, from a single series to a great many. The wheel 10 is mounted for rotation on a shaft 16, the ends of which are carried in side panels to be described hereinafter.

The movable structure further includes a ratchet wheel 18 fixed for movement with the wheel 10. Mounted on the ratchet side of the wheel 10 is a wiper brush plate 20 provided with two slip ring brush fingers 22*a*, 22*b* and two position indicating brush fingers 24*a*, 22*b*. Other finger configurations can be used. The wiper assembly 20 is mounted on the ratchet wheel structure by screws 26. As will be explained hereinbelow, the assembly 20 can be used for read-out and/or presetting purposes.

Figures 3, 3A, 4, 8:
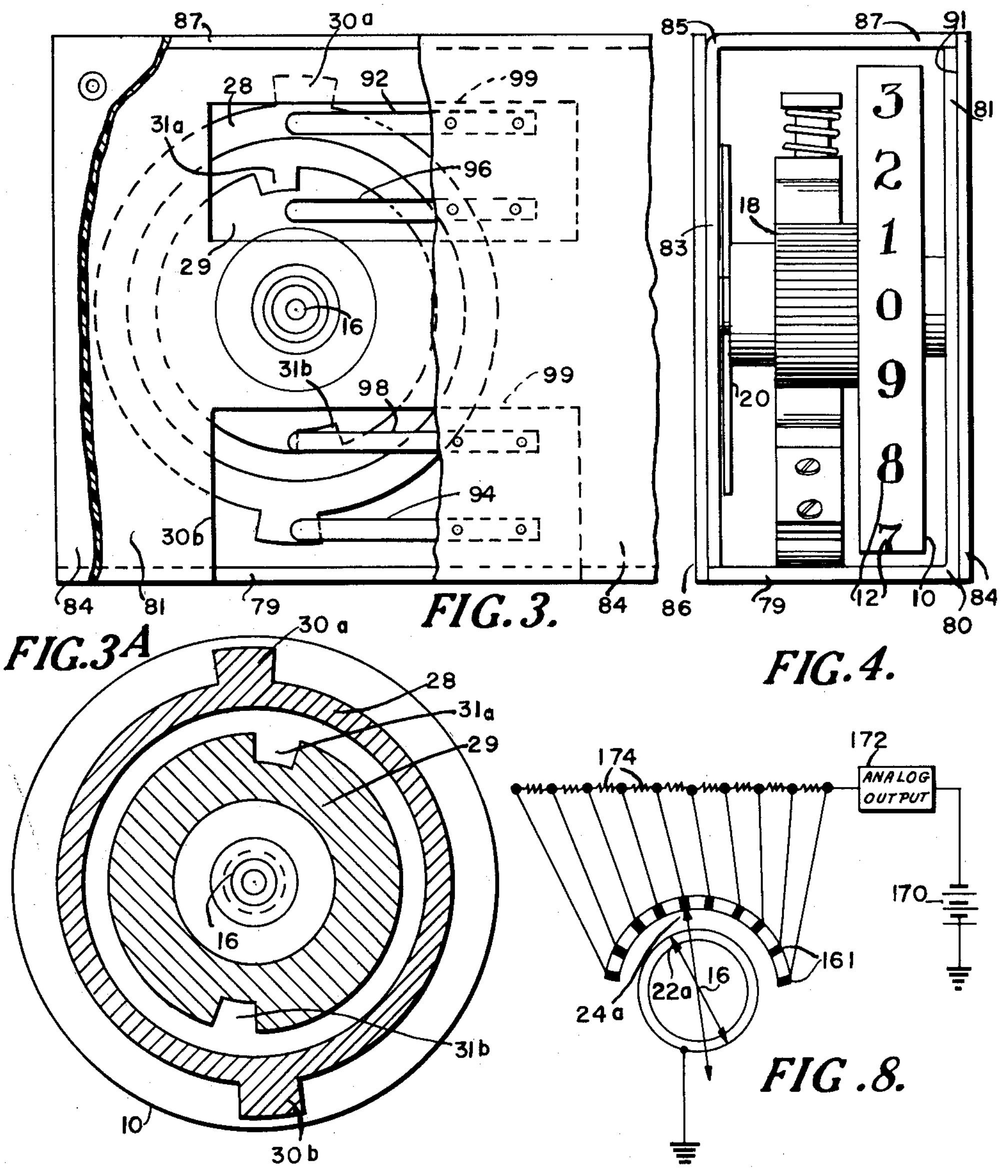
Figure 3 shows a partial side elevational view of the side of the counter unit opposite to the side shown in Figure 1.
Figure 3A shows a side elevational view of one side of a wheel member of the counter unit as shown in Figures 1–3.
Figure 4 shows an end view of the counter unit of Figure 1.
Figure 8 shows counter unit read-out circuits for generating analog voltages.

The side of the wheel 10 opposite from the ratchet wheel and wiper assembly carries slip rings and commutation segments, as may be most clearly understood from Figures 3 and 3A. A carry slip ring 28 is provided concentric about the shaft 16. Slip ring 28 may be electrically conductive material embedded in member 10 which is of non-conducting material. Cross-hatching is employed in Figures 3 and 3A to distinguish the conductive material of the ring 28 from the non-conducting material of the member 10 proper. Two diametrically opposite positions on the member 10 carry commutator segments 30*a* and 30*b*, each electrically connected with the carry slip ring 28. The carry commutator segments 30*a* and 30*b* have a particular angular relationship with the numerals on the wheel 10, with the teeth of the ratchet wheel 18, and with the position of the read-out wiper fingers 24*a* and 24*b*, all as will be described hereinbelow.

Wheel 10 also carries a conductive member 29, having two open areas or segments 31*a* and 31*b*, as shown in Figures 3 and 3A.

Each counter unit is further characterized by an assembly of components for moving the movable structure step by step. This moving means includes a solenoid 32 having a core 34 arranged to attract a clapper member 36. Clapper 36 is pivoted at point 38 of post 40. A spring 42 is provided for normally maintaining the clapper 36 in its upper position as shown in Figure 1 when the solenoid 32 is not energized. A screw and nut combination 44 may be employed, mounted on post 46, for determining the upper position of clapper 36.

The outer end of clapper 36 is provided with a nylon bearing 48 over which is trained a curved portion 50 of a ratchet pawl member 52. A post 54 with a spring 56 thereabout is mounted on the clapper and serves the purpose of retaining end 58 of the ratchet pawl member downwardly on the bearing 48.

The movable structure also includes the movable parts of a single pole double-throw switch 60. As shown in Figure 1, the switch plunger 62 may be operated by a leaf spring type member 64 bearing at point 66 against the clapper.

A back-stop member 68 may be employed for meeting a portion 70 of the ratchet pawl member 52 when the clapper is in its uppermost position. The back-stop 68 will serve to guide the ratchet pawl in its downward movement, due to the contact between the ratchet pawl and back-stop, particularly in vicinity of point 72.

A leaf spring type member 74 mounted on a support arm 76 is provided to prevent rearward movement of the ratchet wheel 18.

The components thus far described are very compactly housed according to a feature of the invention. Reading from left to right in Figure 1, the various main components such as the bottom anchor for spring 42, the post 40, the solenoid 32, the post 46, the back-stop 68 and the backlash spring support 76 may all be affixed to a bottom part 79 of a frame member 80. A post member 82 extends from part 79, for affixing the opposite side members, by screw 82'. On one side of the counter unit is a first side panel 84 and on the other side a side panel 86. These panels may be of insulating material provided with so-called printed circuit wiring. First describing side panel 84, at the end thereof beyond the spring 42, the panel may terminate in a terminal block 85 having contact pins 88 extending therefrom. Printed circuit wiring may run on the inside of panel 84 to rivets 90 whereat are affixed brushes contacting the slip rings and commutator segments on the wheel 10.

As shown in Figure 4, side panel 84 may be attached to frame part 81 of frame 80, with a sheet of insulation 91 between part 81 and panel 84 to prevent shorting the printed circuit wiring. Panel 86 is similarly mounted on part 83 of final frame member 85. The latter has part 87 defining the top cover of the unit. Panel 86 may also terminate at its left-hand end (in Fig. 2) in a terminal block.

Figure 3 is a view of the relationship of the just mentioned brushes to the slip rings and commutator segments on the side of the wheel 10 opposite from the ratchet wheel 18. A first brush 92 (Fig. 3), which may be termed a common carry brush, rides in continuous contact with the slip ring 28. A second brush 94 is positioned to intercept only the commutator segments **30*a* and 30*b*. This is the carry output brush. A third brush 96, a common reset brush, rides continuously on the part of conductor 29 which defines a continuous slip ring. A fourth brush, the reset control brush 98, is positioned to intercept the open areas 31*a* and 31*b***, all as shown in Figure 3.

Side frame part 81 may have necessary apertures 99 cut therein to permit brushes 92, 94, 96 and 98 to contact the surface of the rotary member 10, and on the opposite side, the side frame part 83 may have an aperture therein for permitting the brushes of the wiper assembly 20 to contact commutator segments and slip rings (not shown in Figs. 1–4; see Figs. 7 and 8) on the inner surface of side panel 86.

Figure 5:
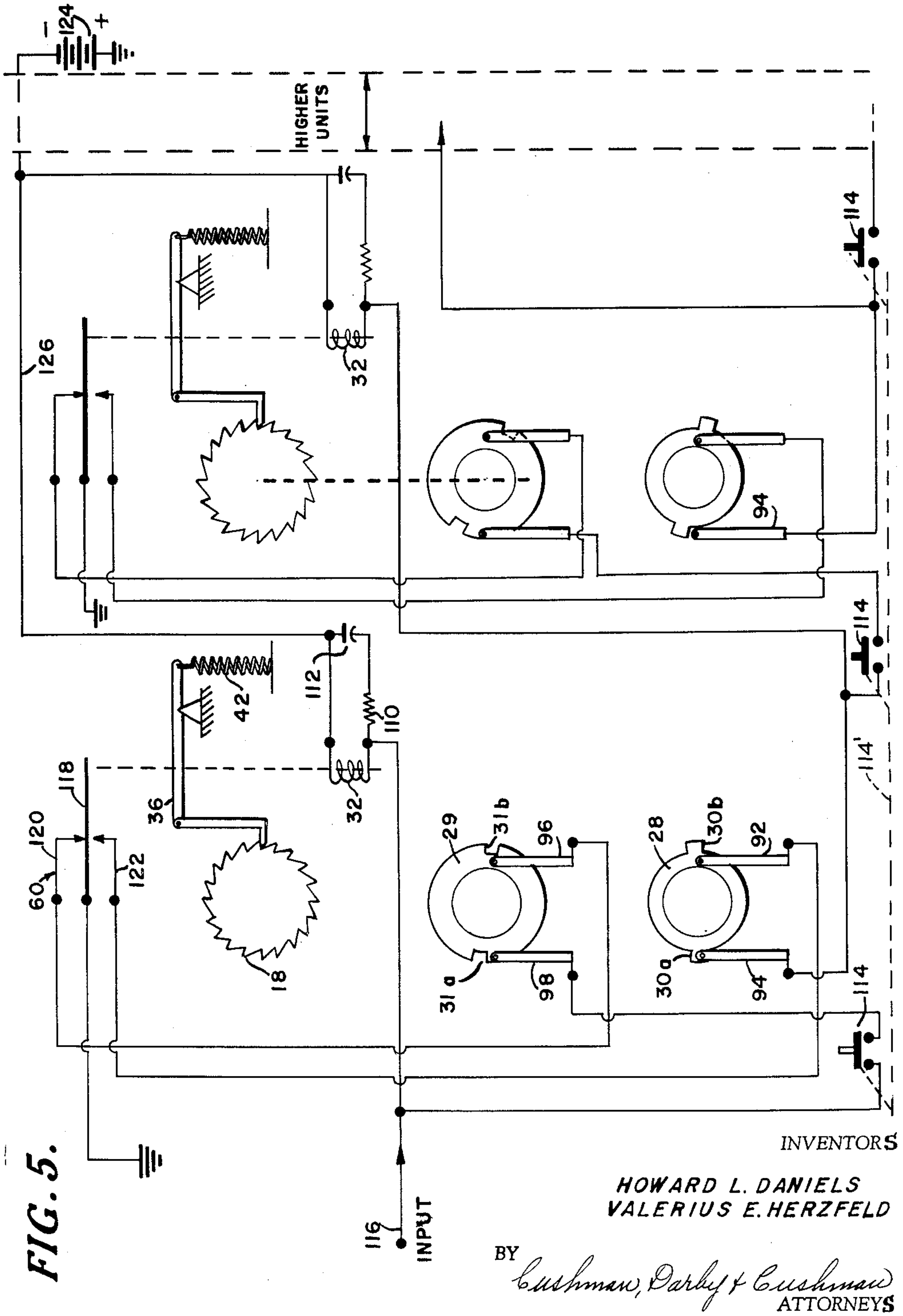
Figure 5 shows a circuit for interconnecting counter units of Figures 1–4.

Electrical circuitry pertaining to the individual units and to a combination of the units into a counter is shown in Figure 5. Taking the left-hand unit, which may be considered the unit of the least significant digit, there are shown in diagrammatic form the solenoid 32, switch 60, ratchet wheel 18, slip ring 28, commutator segments **30*a*, 30*b*, the common carry brush 92, carry output brush 94, the conductive segment 29 and open segments thereof 31*a* and 31*b*. Also, the common reset brush 96 and the reset control brush 98. The next significant digit is to be handled by an identical counter unit to the right of the just described counter in Figure 5. There may be additional stages to the right as will be well understood. Figure 5 shows at each solenoid 32 a circuit including resistance 110 and capacitance 112 for providing a desirable operation of the solenoid, as will be well understood. Figure 5 further shows a reset switch 114, for each unit and a line 116 for providing input signals to be counted. The switch 60 is arranged to have contact closure between a movable arm 118 and upper contact arm 120. When the solenoid is energized and the clapper 36 is in its lower position, then contact will be made between member 118 and lower contact 122, opening the circuit between members 118 and 120**.

The solenoids 32 are connected over bus 126 to one side of a suitable source of potential such as battery 124. The solenoid winding of the least significant digit is connected from its other side to the input line 116. The solenoid 32 of the greater significant digit units are each connected to the carry output brush 94 of the preceding or lesser significant digit unit.

In operation, each time the input count line 116 is energized, as for example by connecting to ground to complete a circuit including source 124, clapper 36 will be moved down against the force of spring 42. This will operate the switch 60 to close contacts 118, 122, but the ratchet wheel will not yet be moved. Closing of contacts 118, 122 will place the common carry brush 92 and therefore slip ring 28 at ground potential. Ending the input on line 116, as by disconnecting from ground, will release the clapper 36 and permit the spring 42 to return same to its original position. During this movement, the ratchet wheel is moved one step. Also during this movement, switch contacts 118, 122 open.

At such time as one of the other of commutator segments **30*a* or 30*b* are in contact with carry output brush 94, and if at the same time switch contacts 118, 122 are closed, current is drawn through the solenoid of the next higher significant digit counter unit, switch arm 118** being grounded. This is the electrical carry.

In accordance with the present invention, the carry signal to the next higher significant digit unit is substantially as long as the input counting signal on line 116. This is accomplished as follows in the particular illustrative embodiment shown in the drawings thus far described: The relationship between the moment of closure of contacts 118, 122, the ratchet wheel teeth with respect to the ratchet pawl member 52, and the placement of the commutator segments **30*a* and 30*b* is to be such that with the wheel 10 or the counter generally at numeral "8," when a signal is applied to line 116 for moving the least significant counter unit to numeral "9," the carry output brush will come into electrical contact with either commutator signal 30*a* or 30*b*, so that the circuit is completed between brushes 92 and 94 when the counter is on the numeral "9" position. However, the circuit should not be established between brush 94 and segment 30*a* or 30*b* until the contacts 118, 122 have opened. In the situation as just reviewed, with the least significant counter unit on numeral "9," application of the next signal on line 116, to move this unit to numeral "0" will close switch contacts 118, 122 of the least significant digit unit and through brushes 92 and 94 current will also be drawn through the solenoid of the next higher digit (the next unit to the right in Figure 5). This will cause attraction of the clapper 36 of the next higher unit to place it in readiness to advance the next said unit. Accordingly, at the termination of the count signal on line 116, the clapper 36 of the least significant digit unit will be released and momentarily thereafter contacts 118, 122** will open, releasing the clapper of the next higher digit unit. Therefore, the ratchet wheels of both units will move together. It will be observed in the case where all of the units of the counter will move simultaneously, in the case, for example, where 999 may change to 000, in the 999 position all of the carry circuits will be "made" and the desired result will be obtained.

After the beginning of the input signal on line 116, the carry signal to the next higher unit will be made as soon as the clapper has been moved sufficiently to close contacts 118, 122. At the termination of the input count signal on line 116, the carry signal to the next unit will remain made until contacts 118, 122 open. This opening will not occur until the clapper 36 of the less significant digit has moved a short distance. Whatever delay there is in establishing the carry signal due to the time required for contacts 118, 122 to close, will be added at the end due to the time required for same to open following termination of the input signal on line 116.

With reference to Figure 3A, where two series of numerals 0–9 are made available, therefore allowing 18 degrees per numeral, it has been found preferable to so arrange the commutator segments 30*a* and 30*b* so that each encompasses its 18° of arc, but with the further provision that when the unit is resting at its position whereat it shows either one of the "9's" the brush 94 will be over the leading edge of the pertinent commutator segment 30*a* or 30*b* to the extent of about 3° of rotation of the wheel 10.

In Figure 5, the left-hand or least significant counter unit is shown in its "9" position.

Reset of each counter unit of Fig. 5 may be accomplished as follows: with the clapper 36 in its unoperated position (the solenoid deenergized) the common reset brush 96 is at ground potential through contacts 118, 120. In all but the 0 position of the unit, brush 98 is placed at ground potential via conductive member 29. In this situation, if reset switch 114 is closed, current is drawn through the solenoid. This opens contacts 118, 120, but not, however, until the ratchet pawl has been placed in motion sufficient for it to move to a position to catch the next tooth of the ratchet wheel. When the solenoid is deenergized due to opening of contacts 118, 120, the spring 42 moves the pawl and ratchet wheel one step. However, the contacts 118, 120 again close and with reset switch 114 remaining closed, another cycle of stepping of the ratchet wheel and associated parts occurs. This repetitious sequence is maintained until brush 98 encounters one or the other of open segments 31*a* or 31*b* in the conductive signal 29. Inasmuch as open segments 31*a* and 31*b* are placed in alignment with the numeral "0" of the unit, the unit will "self-step" to 0 upon closure of the reset switch 114. By means of a common operator for all switches 114 (suggested by dotted line 114' in Fig. 5), all of the counter units can be simultaneously stepped to 0. As a unit of lesser significant digit value steps from 9 to 10, a circuit may be established through the normal carry path, but this will do nothing more than aid the next higher unit in self-stepping itself to 0.

Figure 6:
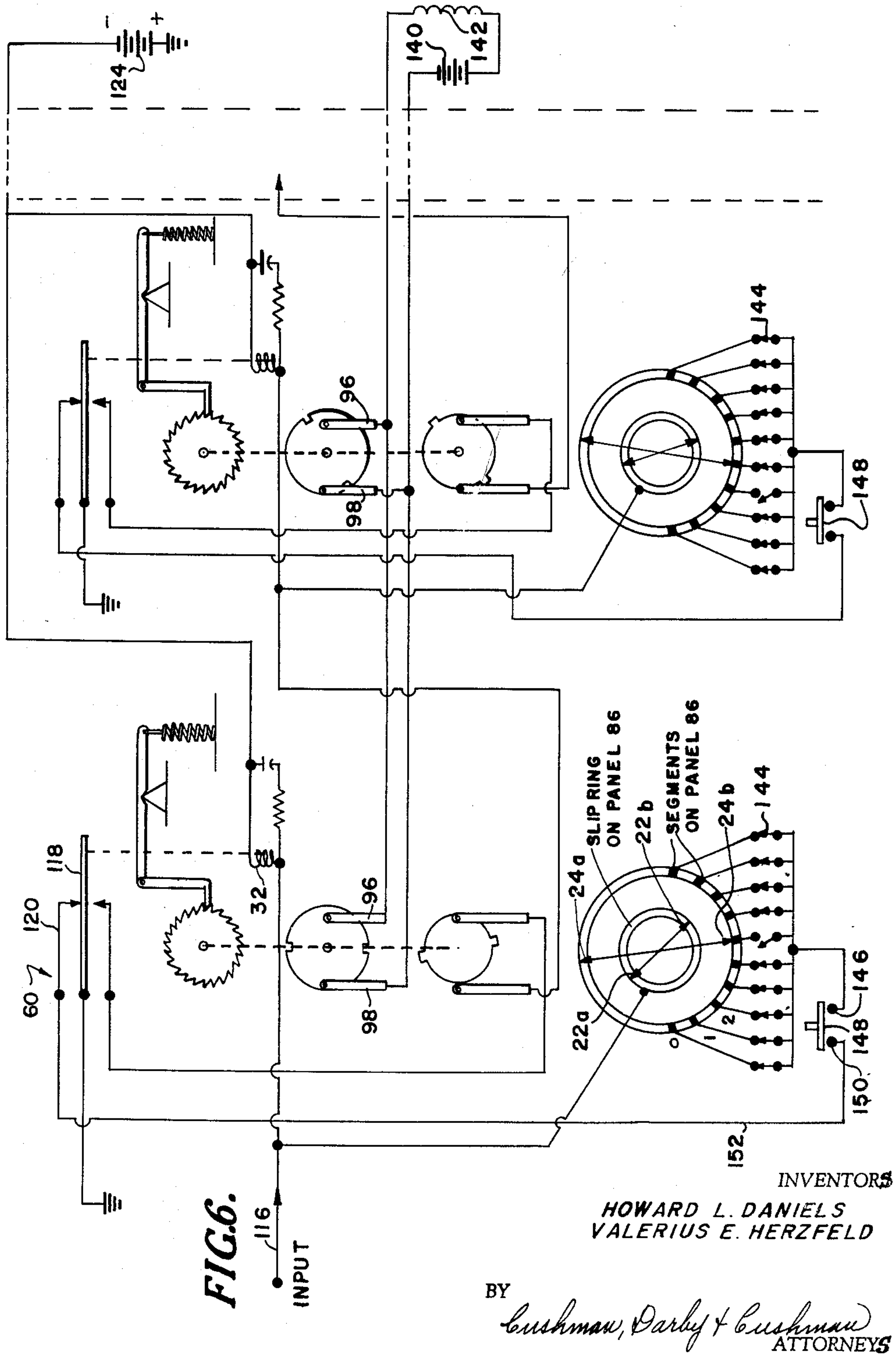
Figure 6 shows a circuit interconnecting counter units of Figures 1–4 and providing presetting circuits.

It may be desirable to preset into the counter a given number and then count "down" to 0 whereat a 0 indication signal may be generated. As a variation, it may be desired to insert a complement and count "up" to 0. In either case, with proper arrangement of numerals on the wheel 10, a circuit may be employed as shown in Figure 6. The brushes 96 and 98 of each counter unit may be placed all in parallel in a circuit energized by source 140 through an indicating relay winding 142. An indicating device (not shown) may come into an "operated" condition upon stoppage of current flow through winding 142. This will occur when all of the brushes 98 are disconnected from their companion brushes 96, showing that each one of the counter units has come to 0. The carry circuits will remain the same.

At least one of the brushes of the wiper assembly 20 may be employed in conjunction with commutator segments on the inside surface of side panel 86, to sense the condition of a plurality of preset selection switches 144, as diagrammatically illustrated in Figure 6. Let it be assumed that brush 24*b* of the wiper assembly 20 is in use for this purpose, and is in contact with segment number 5 of 10 segments numbered from 0 through 9 in Figure 6. Each of the switches 144 has one contact connected in common to a first contact 146 of a preset pushbutton switch 148. The remaining contact 150 of switch 148 is connected over line 152 to the contact 120 of switch 60. It will be understood that there is a gang of switches 144 for each of the more significant digit counter units.

In presetting a number into the left-hand counter unit shown in Figure 6, all of the switches 144 may be closed except the number 5 switch, 5 being the number to which the counter unit is to be preset. Let it further be assumed that at the beginning of the preset operation, the contact 24*b* is in contact with some other segment, such as number 2. Closure of preset switch 148 will place all of the preset commutator segments at ground potential except number 5. Since contact 24*b* initially is in contact with number 2 segment, line 154, connected to the count input line 116, will be placed at ground potential. The result is a current flow through solenoid 32 of the left-hand unit. The clapper 36 will be actuated and contacts 118, 120 will open, the solenoid 32 is deenergized and the movable structure moves one step. The resetting operation of Figure 5 is similar in this respect. The contacts 118 and 120 will again close and the unit will self-step until the contact 24*b* arrives at preset commutator segment number 5. Due to the fact that switch 144 connected to the number 5 signal is opened, the automatic or self-stepping action will stop and the unit will then be preset at number 5. Normal input count signals on line 116 will thereafter step the counter in the normal fashion, with carries going to the other units as required. There may be a common operator (not shown) for the switches 148.

Figure 7:
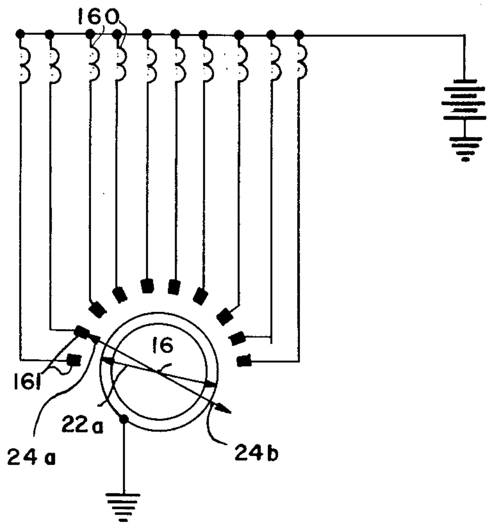
Figure 7 shows read-out circuits in diagrammatic form.

It will be understood how the wiper assembly 20 may be employed to provide a read-out in any suitable code. Figure 7 diagrammatically illustrates how contacts such as 24*a* and 24*b* of wiper assembly 20 can be employed to give a decimal code. In Figure 7 the coils 160 may be solenoids for operating a tape punch. Reference character 161 represents commutator segments on the inside of side panel 86. These may be wired by printed circuits on panel 86 to terminal block (not shown) on the end of panel 86. Any code, such as binary, or other, can be obviously accomplished by providing the necessary relationship between brushes on the wiper assembly and commutator segments on the side panel 86. A suitable opening may be made in side frame part 83 to permit brushes 22*a*, *b* and 24*a*, *b* to reach the inside of side panel 86.

An analog output can be arranged by interconnecting resistance between segments such as segments 161 of Figure 7, so that a circuit from a brush 24*a* or 24*b* includes a given number of resistances, therefore presenting a given different voltage drop for each position. Such a read-out circuit is shown in Figure 8. Source 170 will force various currents through output means 172 depending upon the number of resistors 174 in series.

Figure 9:
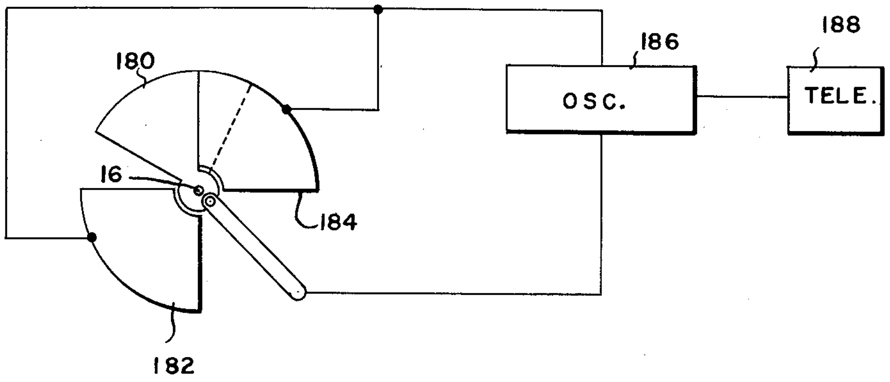
Figure 9 shows a counter read-out circuit for altering the frequency of circuits in accordance with the instantaneous count in the counter units.

As shown in Figure 9, frequency output by capacitive means can be accomplished by having the wiper assembly 20 replaced by a suitable capacitance plate 180 movable over commutator segments in the form of opposite capacitor plates 182 and 184. This may alter the frequency of an oscillator circuit 186. The oscillator can be part of telemetering circuit 188, as an example.

It will be appreciated that there are many equivalents of the specific illustrative embodiments of my invention disclosed hereinabove. Therefore, the scope of the invention is to be determined from the appended claims.

What is claimed is:

1. In an electro-mechanical counter unit, a movable assembly, means for moving the assembly step by step, a circuit for self-stepping the unit, means for completing the self-stepping circuit at a first point for energization of the moving means, energization of the moving means setting the moving means for moving the assembly one step upon de-energization of the moving means, switch means in the self-stepping circuit at a second point thereof arranged to be opened during at least a portion of the energization period of the moving means, and to be closed upon deenergization of the moving means the arrangement being such that upon completion of the self-stepping circuit at the first point the moving means is repetitively energized and de-energized by said switch means for stepping the counter, the unit further characterized by the self-stepping circuit including at a third point means for opening said circuit upon the moving assembly reaching a predetermined position and wherein the self-stepping circuit includes means for assigning in advance the stopping point of the movable assembly, whereby the unit may be preset to a predetermined position by the self-stepping action.

2. In an electro-mechanical counter unit, a frame, a movable assembly, means for moving the assembly step by step, switch means, and commutator segment and brush means one carried by the frame and one by the movable assembly, movement of the moving means from a first position to a second position setting the moving means for movement of the assembly by one step upon return to the first position, a carry circuit, means to operate said switch means to close the carry circuit at a first point while the moving means is in said second position, and switch means for closing the carry circuit at a second point when the movable assembly is at its step immediately preceding the step whereat carry is to be completed, the arrangement being such that the movable assembly in moving from two steps preceding the completed carry setting to the step immediately preceding said setting closes the carry circuit at the commutator and brush means but only after opening of the switch means concurrently with return of the moving means from its second position to its first position.

3. A unit as in claim 2 wherein the switch means is mechanically linked to the moving means.

4. In an electro-mechanical counter unit, a movable assembly, means for moving the assembly step by step, a circuit for self-stepping the unit, means for completing the self-stepping circuit at a first point for energization of the moving means, energization of the moving means setting the moving means for moving the assembly one step upon deenergization of the moving means, switch means in the self-stepping circuit at a second point thereof arranged to be opened during at least a portion of the energization period of the moving means and to be closed upon deenergization of the moving means, the arrangement being such that upon completion of the self-stepping circuit at the first point the moving means is repetitively energized and deenergized by said switch means for stepping the counter, the self-stepping circuit including at a third point means for opening said circuit upon the moving assembly reaching a predetermined position, the self-stepping circuit including means for assigning in advance the stopping point of the movable assembly, whereby the unit may be preset to a predetermined position by the self-stepping action, the unit, further including means responsive to the movable assembly for generating a signal when the movable assembly reaches a position other than said preset position.

5. In an electro-mechanical counter unit, a frame, a movable assembly, means for moving the assembly step by stem, switch means, movement of the moving means from a first position to a second position setting the moving means for movement of the assembly by one step upon return of the moving means to the first position, a self-stepping circuit, means to operate said switch means to open the self-stepping circuit at a first point while the moving means is in said second position, and for closing the self-stepping circuit while the moving means is in said first position, separate means for closing the self-stepping circuit at a further point when self-stepping operation is desired, the arrangement being such that with the self-stepping circuit closed at said further point the self-stepping circuit is closed at said switch means to move the moving means to the second position thereof whereat the switch means is opened thus de-energizing the moving means so that the moving means returns to its first position and in so doing moves the movable assembly one step whereupon the cycle is repeated and the unit is repetitively self-stepped, the self-stepping circuit being further provided with commutator segment and brush means one carried by the frame and one by the movable assembly, the commutator segment means being arranged to disengage the brush means at a position of the movable assembly relative to the frame whereat self-stepping action is to be terminated, and wherein additional commutator segments are provided for engagement with the brush means, and self-stepping circuit includes means for routing the self-stepping circuit through predetermined ones of the segments to effect presetting of the movable assembly to a predetermined position.

6. In an electro-mechanical counter unit, a frame, a movable assembly, means for moving the assembly step by step, and means for presetting the movable assembly to a predetermined one of a number of possible preset positions, the presetting means including segmental commutation means having one position for each possible preset position, switch means connected with each preset commutation segment whereby the switch of a segment corresponding to the desired preset condition can be placed in a condition different from the remaining switches, the unit including means for automatically self-stepping the unit until the presetting circuit is disabled by establishment of the circuit to said differently set commutation segment switch of the preset commutation means.

References Cited in the file of this patent

UNITED STATES PATENTS

| | | |
|---|---|---|
| 945,236 | Hollerith | Jan. 4, 1910 |
| 1,307,369 | Messiter | June 24, 1919 |
| 2,295,968 | Poole | Sept. 15, 1942 |
| 2,433,389 | Newton | Dec. 30, 1947 |
| 2,465,198 | Christiansen | Mar. 22, 1949 |
| 2,625,822 | Nichols | Jan. 20, 1953 |
| 2,700,076 | Goode | Jan. 18, 1955 |